Figure 2:
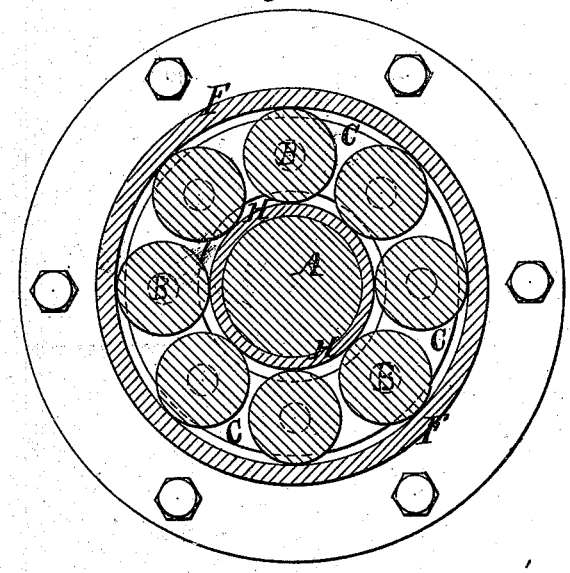

H. P. Westcott,
Anti Friction Roller.

No. 112,660.   Patented Mar. 14, 1871.

Witnesses.

Inventor.
Henry P. Westcott
By R. Bickford, Atty

UNITED STATES PATENT OFFICE.

HENRY P. WESTCOTT, OF SENECA FALLS, NEW YORK.

IMPROVEMENT IN ANTI-FRICTION JOURNAL-BOXES.

Specification forming part of Letters Patent No. 112,660, dated March 14, 1871.

*To all whom it may concern:*

Be it known that I, HENRY P. WESTCOTT, of Seneca Falls, county of Seneca, and State of New York, have invented a new and useful Improvement in the Method of Using Anti-Friction Rollers upon Axles and Journals; and I do hereby declare that the following is a full and exact description thereof, reference being had to the accompanying drawings, and to the figures and letters thereon.

The object of my invention is to lessen the friction upon axles and journals wherever used.

My invention consists of a loose thimble or sleeve and a series of rollers—three or more in number—surrounding an axle or journal and supporting and revolving with or upon said axle or journal, the rollers being kept at fixed distances apart upon said thimble, to avoid friction of the rollers upon each other, by means of two revolving disks or rings pierced with holes corresponding in number with the number of rollers used, and designed to hold the ends or axles of said rollers at fixed distances apart; or the rings may be used to sustain fixed axles for said rollers to turn upon. The axle or journal, with its surrounding thimble, rollers, and separating-rings, is inclosed in a cylindrical metallic case or hub of a size sufficient to hold said thimble, rollers, rings, and axle or journal compactly together, allowing, however, a small space between the rings and the ends of the cylinder or hub for lateral motion. By employing the loose thimble or sleeve this lateral motion of the axle takes place wholly within the thimble and entirely independent of the rollers, thus preventing any twisting motion of the rollers or any tendency toward such a motion. This thimble or sleeve fits loosely upon the axle, and lies, therefore, between the axle and rollers. When the axle revolves, as in the case of a car-axle or a line of shafting, this thimble will revolve with it, in consequence of the friction of the axle upon it, and it will in turn cause the anti-friction rollers to revolve, thus converting all the rubbing friction of an axle (as usually constructed) into rolling friction—in other words, reducing the friction to a minimum. The thimble, by being made of any desired thickness, can be made to exactly fill the space between the axle and rollers, whatever the relative sizes of the axle, rollers, and hub may be, whereas without the sleeve it is difficult to adjust the size of the hub, the size of the rollers, and the number of rollers to an axle of a definite required size. Another advantage of thimble is that any wear that may take place within the hub or box, whether it be of the axle, thimble, rollers, or hub, can all be taken up readily by removing the old thimble and replacing it with a thicker one. By using the cover of the end of the hub in two parts, as shown, the lower half may be attached with a packing, making the joint oil-tight, so that the hub may be kept nearly half-full of oil, if so much oil were found desirable in practice. The upper half of the cap may be removed for the inspection of the interior or for supplying oil without disturbing the lower part.

Figure 1:
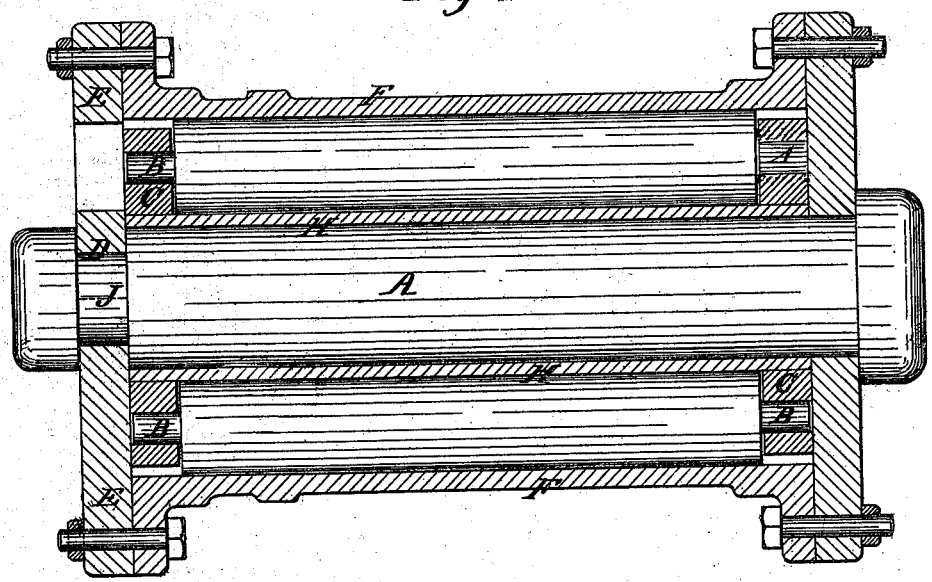

Figure 1 represents a longitudinal or horizontal section of the hub and contents. Fig. 2 represents a vertical section of the same, the letters in both figures referring to the same parts, respectively.

A shows the axle; B B, the ends or axles of the rollers; C, the revolving rings. D is a groove cut in the axle to receive the cap, by means of which the hub and axle are held together in position. E is the cap. F is the hub or case, and H is the sleeve or thimble. J shows the line of division between the upper and lower halves of the cap.

Having thus described my invention, I claim and desire to have secured by Letters Patent—

1. The hub or box F, with a head or cap, E, made in two parts, designed to fit into a groove, D, cut in an axle, A, to hold the axle in place, and for the purpose of an oil-box, arranged substantially in the manner as and for the purposes set forth and described.

2. An axle, A, in combination with sleeve H, rollers B B, and separating-rings E, all constructed and arranged substantially in the manner as and for the purposes set forth.

3. The loose thimble or sleeve H upon an axle or shaft, A, in combination with the anti-friction rollers B B, the separating-rings C, the groove D in the axle A, the hub F, and the cap E in two segments, substantially in the manner as and for the purposes set forth and described.

Witness my hand this 18th day of January, 1871.

HENRY P. WESTCOTT.

Witnesses:
R. BICKFORD,
JACOB H. CORL.